April 24, 1951

J. KUPERUS ET AL 2,549,978

SCHMIDT TELEVISION PROJECTOR HOUSING HAVING
OBJECT SURFACE ADJUSTABILITY IN THREE
MUTUALLY PERPENDICULAR DIRECTIONS

Filed Jan. 11, 1947

JAN KUPERUS & PIETER MARTINUS VAN ALPHEN
INVENTORS

BY

AGENT

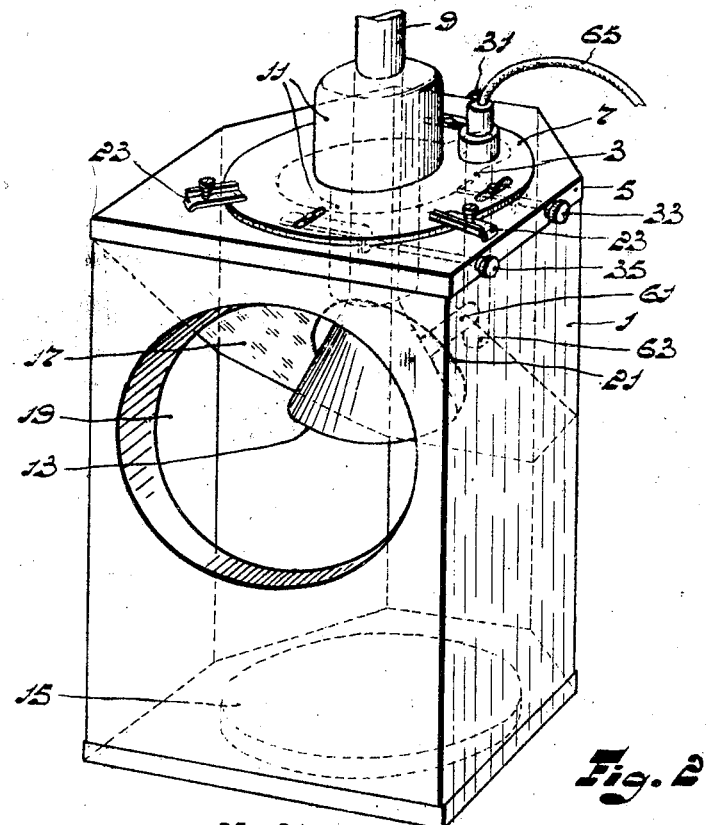
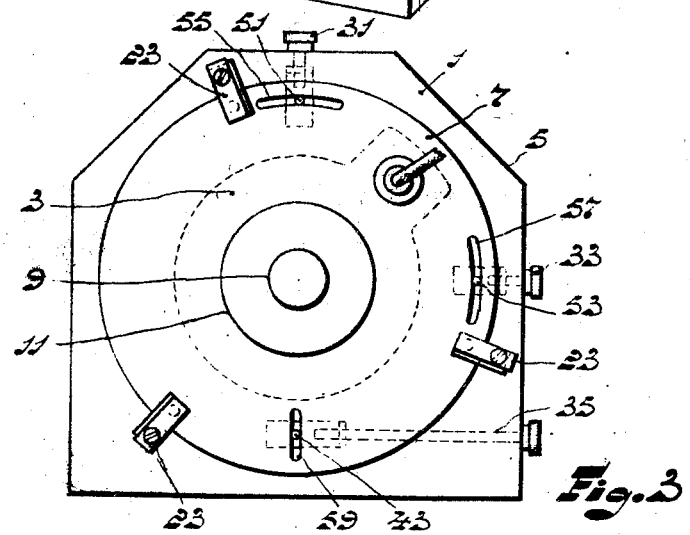

Patented Apr. 24, 1951

2,549,978

UNITED STATES PATENT OFFICE 2,549,978

SCHMIDT TELEVISION PROJECTOR HOUSING HAVING OBJECT SURFACE ADJUSTABILITY IN THREE MUTUALLY PERPENDICULAR DIRECTIONS

Jan Kuperus and Pieter Martinus van Alphen, Eindhoven, Netherlands, assignors to Hartford National Bank and Trust Company, Hartford, Conn., as trustee Application January 11, 1947, Serial No. 721,650
In the Netherlands November 21, 1945

Section 1, Public Law 690, August 8, 1946
Patent expires November 21, 1965

4 Claims. (Cl. 177—319)

This invention relates to a television receiver of the projection type comprising a reflecting optical system and a cathode-ray tube as the image-reproducing device. In receivers of the projection type the luminous screen of the said tube, on which a television image of high brilliance is formed, is arranged to face a concave mirror, whereby the image may be projected on a screen.

In this device the focussing of the image has heretofore been difficult as will appear more fully with reference to the following description of Fig. 1 of the accompanying drawing.

In the case of a concave mirror the so-called object surface, which is the surface in which an object must be located in order to obtain a sharp image thereof on a flat projection screen, is generally curved. In the case of a spherical mirror (designated in Fig. 1 by reference numeral S) the object surface O is, in the field concerned, at least approximately spherical. In view thereof the luminous screen L of the cathode-ray tube B, on which the image to be projected appears, exhibits a curvature corresponding with that of the object surface O. In the case shown in the drawing the luminous screen L is not located in the object surface O, since the axis A of tube B does not pass through the centre of curvature M of the object surface. The intersection of the surfaces L and O, however, is located in the object surface and that part (zone) of the image on the screen L which is located along this intersection is projected sharply defined, whereas the remaining part of the image on the screen is ill-defined. In order to focus also this part, the tube must be tilted about a point P of the said line of intersection until the surfaces L and O are coincident.

For this purpose it is already known to arrange tube B so as to be tiltable about the centre of the screen L, for example by supporting the tube on a spherically curved plate F, which is slidable along a correspondingly curved fixed plate G and which, within certain limits, can be fixed in any position, for example by means of screws which are passed through excessively wide apertures.

However, this possibility of adjustment has been found to be very unsatisfactory in practice, since the zone projected sharply defined on the screen does not procure a simple indication of the directions in which the tube must be moved for focussing the entire image. There is only one position in which this is the case: the position in which the axis A of tube B passes through the centre M of the object surface, and in any other position only a zone of the image is sharply defined. Upon displacement of the tube B this zone moves across the projection screen and invariably retains its definition, the rest of the image remaining blurred, unless, accidentally, the position is reached in which the whole of the image is sharply defined.

This difficulty is obviated in the invention by the fact that, whilst using a mirror having an object surface which is substantially spherical and a cathode-ray tube having a luminous screen which is at least substantially curved spherically, use is made not only of the ordinary focussing device for the axial displacement of the cathode-ray tube with respect to the optical system, but also of two relatively independent adjusting devices by which the cathode-ray tube can move, relatively to the concave mirror, in two separate directions normal to one another and to the axis of the tube. The simplest form from the point of view of the construction is obtained when tube B is movable in parallel with itself which is permissible when the amount of adjustment required is a matter of a few tenths of a millimeter in which case the arc of the circle of movement is small and thus becomes equal to the chord, since in this case the plates F and G are plane.

The focussing operation of the image is, in this case, effected as follows: tube B is displaced, by means of the horizontal adjusting device, to such extent that the position B' is reached, in which the axis A' of tube B' is located perpendicularly over point M (Fig. 1 is to be considered, in this case, as a top view). The line of intersection of the spherical surfaces O and L is a circle, of which the small portion located within the boundaries of the luminous screen L can be regarded approximately as rectilinear, and this straight line of intersection is horizontal in the position A', B', which appears from the fact that the sharply defined zone of the projected image, which at first occupied any arbitrary position, is now horizontal.

Subsequently, the tube is displaced, by means of the vertical adjusting device, to such extent that the axis A' passes through point M, which appears from the great definition of the entire image. Slight correction by means of axial displacement of tube B will generally be required both during the horizontal and the vertical displacement.

Consequently, the prescription for the adjustment is very simple: if necessary with readjustment by means of the axial shifting device, first to regulate the horizontal adjusting device until the "sharply defined zone" is horizontal and then to focus the image by means of the vertical adjusting device. As a matter of course, attempts may be made to use this method also in the device of known type as shown in Fig. 1, but this is not practicable, since the distances to be covered in the adjustment are only a few tenths of millimeters (for the sake of clearness the proportions are represented on an exaggerated scale in Fig. 1). Such fine adjustment is not practicable without the use of auxiliary devices. Moreover, it is very difficult for the operator to perform by the sole sense of feeling only one displacement, for example horizontal, without acting at the same time upon the other (vertical) displacement.

The remark made with reference to Fig. 1 applies, if the projection screen is normal to the direction of projection. If the projection screen is inclined to this direction, the object surface occupies likewise an inclined position relatively to the spherical mirror and is not coincident with the object surface O shown in the drawing. The prescription for the adjustment remains, however, unchanged.

It can be readily seen from Fig. 1 that focussing by means of displacement is only possible if both the object surface O and the luminous screen L are at least substantially spherical, since only in this case is the curvature of the object surface uniform throughout (that is to say spherical) and consequently the likewise spherical luminous screen can in every case be caused to coincide with the object surface by the displacement.

As a matter of course, instead of the cathode-ray tube, the mirror may be adapted to move in two directions normal to the axis of the tube, since the displacement of the two parts relatively to one another is only essential.

In the case of microscopes it is already known to move the object in two directions normal to one another and to the axis of the optical system by means of adjusting devices, the object being to give the object the correct position relatively to the optical system, so that the desired image ensues. In the case of microscopes no difficulty is involved, since the object surface is flat. In a television receiver comprising a reflecting optical system, this method of adjustment is, however, unserviceable, because the image would become ill-defined even by a slight displacement of the object. Consequently, the effect obtained with the device according to the invention with its two displacements normal to one another is entirely different from that obtained with a microscope, in which the focussing requires only an axial displacement.

The displacements normal to the axis of the cathode-ray tube may also bring about displacement of the projected image over the projection screen. This displacement is undesirable and may, if necessary, be compensated, for example, by a slight displacement of the assembly of tube and optical system. As an alternative, the image may be caused to move over the screen of the tube by means of electrical or magnetic means. However, in practice the focussing operation requires such small displacements that the displacement of the image, whose position is not very critical, is not troublesome.

The rotational position of the image on the screen is more critical; for its adjustment the cathode-ray tube is arranged to be rotatable about its axis, independently of the adjustments previously described.

In order that the invention may be clearly understood and readily carried into effect, it will now be described more fully with reference to the accompanying drawings.

Figs. 2 and 3 illustrate one practical form of construction of the new device as described.

Fig. 2 shows the assembly of a cathode-ray tube and an optical system, the assembly forming part of a television receiver according to the invention.

Fig. 3 is a top view of the device shown in Fig. 2, whereas

Figure 1:
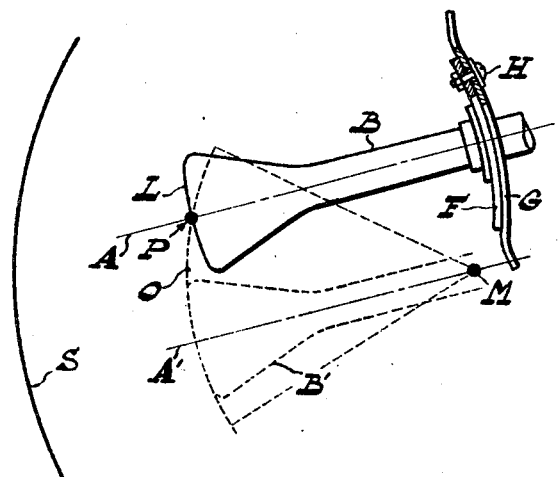

The device shown in Fig. 2 comprises a case 1, for example of metal, which is substantially entirely closed and which has a lid 5 provided with a central aperture 3. The lid 5 has concentrically arranged on it a disc or plate 7 which serves as a supporting member for a cathode-ray tube 9 of the projection type, comprising a deflection coil system 11; the tube is coaxially arranged on the plate 7. Opposite the luminous screen 13 of tube 9, on the bottom of the case 1, there is arranged a spherical mirror 15. The rays emerging from the image which appears on the screen 13 are reflected by the mirror 15 in the axial direction and fall upon a plane mirror 17 which is arranged at an angle of 45° to the axis of tube 9 and which throws the rays, through an aperture 19, on a projection screen (not shown) located outside the case 1. An aperture 21 provided in the centre of the mirror 17 serves for the passage of the tube screen 13.

In order to facilitate the focussing of the image in the manner described, tube 9 can be displaced with a certain degree of accuracy relatively to mirror 15 in two directions normal to one another and to the axis of the tube. Moreover, in order to permit correction of any inclined position of the image projected, the tube is rotatable about its axis. These different possibilities of adjustment are realized in a simple manner by means of the device which will be explained more fully with reference to the top view in Fig. 3. The conventional device for the axial displacement of the tube or of the mirror relatively to the tube, which device is also required for focussing, is omitted in order to simplify the drawing.

Figure 4:
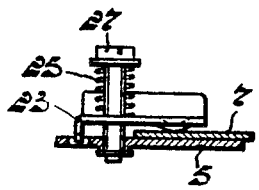
Figures 4 and 5 show details thereof.

The supporting plate 7 already described with reference to Fig. 2 is pressed against the lid 5 by three brackets 23 which are fastened along the periphery of the plate to the lid 5 and are subject to spring pressure. One of these brackets is shown in detail in Fig. 4. The bracket 23 is pressed against the lid by means of a helical spring 25 which is arranged under the head of a bolt 27 and coaxially thereof. The arrangement is such that the disc 7 is rotatable in its plane and slidable through a short distance in any direction.

Figure 5:
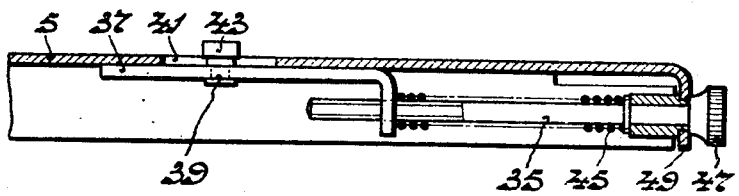

Three adjusting members constituted by bolts 31, 33 and 35 parallel to the lid are arranged under the lid 5, the heads of the bolts projecting to the exterior through the flanged edge of the lid. To illustrate this, Fig. 5 shows the adjusting member 35 in detail. The threaded end of bolt 35 can be screwed in and out of the rectangularly-bent end of a metallic strip 37, which is slidable in the direction of its length along the bottom side of lid 5. This is achieved by fixing in the strip 37 a pin or stud 39 which can move in a suitable slot 41 of lid 5 and which has a head 43 which is wider than slot 41. A helical spring 45 keeps the head 47 of bolt 35 pressed against the flanged edge 49 of lid 5. The other two adjusting members 31 and 33 are identical and are provided with studs corresponding with studs 39, 43 their heads being designated 51 and 53 in Fig. 3. The said studs 51 and 53 move in radial slots (not shown) which are similar to slot 41 for stud 43 and which are formed in the lid 5. These studs engage slots 55 and 57 respectively, in the plate 7 as shown in Fig. 3. Bolts 31 and 33 and hence the directions of movement of studs 51 and 53 are radial with respect to disc 7 and normal to one another, whereas the direction of movement of stud 43, which is diametrically opposite stud 51, is parallel to that of stud 53 and consequently tangential with respect to disc 7.

Studs 51, 53 and 43 are provided in suitable slots 55, 57 and 59 of plate 7 and can move in them. Slots 55 and 57 form part of an imaginary circle concentric to disc 7, whereas slot 59 extends radially. It is readily evident from Fig. 3 that on turning bolt 35 the disc turns about its centre, whereas turning bolt 31 has the effect of displacing disc 7 substantially along the connecting line between studs 51 and 43. If bolt 33 is turned, disc 7 rotates about stud 43, which is to be considered as the resultant of a rotation about the centre and a translation according to the direction of bolt 33. This procures a possibility of adjustment in the last-mentioned direction, since the rotation may be neutralized by means of the adjusting member 35 without any change of the adjustment in the direction of translation being involved. The very simple arrangement described thus procures three relatively independent adjusting possibilities, namely two translations normal to one another and a rotation, whilst using only one movable support. Summarizing the foregoing, it will be seen that by means of the bolt 31 the disc 7 may be moved in one direction (vertically in Fig. 3) and by means of the bolts 33 and 35 the disc 7 may be moved in a second direction normal to the first direction (horizontally to Fig. 3) and independently of the direction of movement effected by the bolt 31. Furthermore, by means of the bolt 35, the disc 7 may be rotated about its center thereby rotating the cathode ray tube 9 about its longitudinal axis.

A further advantage of the construction as described is that the plate 7 on which the cathode-ray tube 9 is arranged can be readily lifted from the case 1, for example in the event of repairs, and subsequently be provided again in its initial position. The lifting operation is possible after the three brackets 23 have been turned through 90° each about its respective bolt 27 (see Figs. 3 and 4). Disc 7 can be immovably fixed by tightening the bolts 27 to such an extent that each associated spring 25 is compressed completely.

In order that the supply wires may interfere as little as possible on lifting plate 7 and tube 9, it is advisable for any connecting leads to switching elements located at the interior of case 1 and associated with tube 9 to be led through plate 7. In the present case the cathode-ray tube 9 is of the type in which the supply lead for the electrode (anode) conveying high tension is led to the exterior through a bushing 61 located immediately behind the mirror 17. In this case a lead-through insulator 63, which is connected to the supply terminal of the said electrode, is likewise secured to the supporting plate 7. The high-voltage lead 65 is in this case not connected to case 1 itself and does not impede the removal of plate 7 and of tube 9.

In Fig. 7 there is shown the adjustment means of the invention as applied to systems in which adjustments greater than those permitting the use of plane mounting plates, i. e., adjustments greater than a few tenths of a millimeter are required and wherein, accordingly, the arc of movement of the mounting plate can no longer be considered as being equal to the chord of the arc. The adjustment means shown comprises a lid 5' and a mounting plate 7' positioned on lid 5'. The lid 5' and plate 7' correspond to the plates F and G of Fig. 1 and are constituted by sectors of concentric spheres having their centers at the point P in order that the tube shown in part at 9' may be tilted about the said point as set forth in connection with Fig. 1 and are held in contacting relationship by the brackets 23'. For providing independent adjustments normal to each other for positioning the tube 9' there are provided adjustment bolts 33' and 31' and associated components which are identical in structure to the adjustment components associated with the bolts 31, 33 and 35 of Figs. 2 and 3. More particularly, for adjusting the tube in a direction in the plane of Fig. 7 the lid 5' is provided with a radial slot 70 within which a stud 53' having an enlarged head is positioned and secured to a bracket strip 70. The head of the stud 53' engages a slot 57' formed in the disc 7' which slot 57' conforms to the slot 57 shown in Fig. 3. As in the case of the adjustment means previously described, rotation of the bolt 33' which threadedly engages the strip 65' produces in and out movement of the stud 53' which in turn moves the disc 7' over the surface of the lid 5' and moves the tube 9' about the point P. A spring 72 is positioned about the bolt 33' and interposed between the strip 71 and the tip of the lid 5'. For moving the tube 9' independently in a direction normal to the plane of Fig. 7 an adjustment means is provided identical to that above described and comprising a bolt 31', a bracket strip 75 and a stud 51'. Similarly, for rotating the tube 9' about its longitudinal axis an adjustment means is provided conforming to the above described and positioned tangentially as in the case of the adjustment means 35 of Fig. 3. In order not to unduly complicate the showing in Fig. 7, this latter adjustment is not shown in Fig. 7. However, its arrangement and construction as applied to Fig. 7 is readily discernible from Figs. 2 and 3.

What we claim is:

1. A projection type television receiver comprising an optical projection system having a concave image-projecting mirror, said mirror having an optical axis and a substantially spherical object surface, a cathode ray tube having substantially spherical image screen of rotational symmetry of substantially the same curvature as said object surface and having an axis substantially coincident with the axis of symmetry of said screen, a housing supporting said mirror, a plate-shaped member supported on said housing and holding said tube with said screen in the neighborhood of said object surface, three adjusting means on said housing arranged to effect three independent adjustable movements of the said member and the tube held thereby, one of said movements being in a direction normal to said optical axis, a second being in a direction normal to said optical axis and to said first direction, and a third being rotational about said tube axis, each said means comprising guiding means for substantially determining the said direction of movement caused upon operation of one of said adjusting means, whereby said screen and said object surface may be brought into substantial coincidence.

2. A projection type television receiver comprising a reflecting optical projection system having a concave image-projecting mirror, said mirror having an optical axis and a substantially spherical object surface, a cathode ray tube having a substantially spherical image screen of rotational symmetry of substantially the same curvature as said object surface and having an axis substantially coincident with the axis of symmetry of said screen, a housing supporting said mirror, a plate-shaped member slidably supported on said housing and holding said tube with said screen in the neighborhood of said object surface and with the plane of said member normal to said tube axis, three adjusting means on said housing arranged to effect three independent adjustable movements of the said member and the tube held thereby, one of said means effecting slidable movement of said member substantially in the plane thereof and in one direction only, a second said means effecting slidable movement of said member substantially in the plane thereof and only in a second direction at right angles to said one direction, and the third said means effecting only rotation of said member about said tube axis, each said means comprising guiding means for substantially determining the said direction of movement caused upon operation of one of said adjusting means, whereby said screen and said object surface may be brought into substantial coincidence.

3. A projection type television receiver comprising a reflecting optical projection system having a concave image-projecting mirror, said mirror having an optical axis and a substantially spherical object surface, a cathode ray tube having a substantially spherical image screen of rotational symmetry of substantially the same curvature as said object surface and having an axis substantially coincident with the axis of symmetry of said screen, a housing supporting said mirror, a substantially planar plate-shaped member slidably supported in the plane thereof on said housing and holding said tube with said screen in the neighborhood of said object surface and with the plane of said member normal to said tube axis, first and second studs on said housing supported thereby to be movable each in a given line in the plane of said plate passing substantially through said axis, said lines being normal to each other, a third stud on said housing supported thereby to move in a line in the plane of said plate distant from said tube axis, said member having two arcuate slots substantially concentric with said axis and the sides of which closely engage respectively said first and second studs and being disposed substantially at right angles with respect to said tube axis, a longitudinal slot having its length disposed along a line passing substantially through one of said first two studs and said axis and closely engaging said third stud, whereby said plate may be slidably moved to bring said screen and said object surface into substantial coincidence and whereby said screen may be rotated about its axis.

4. For use in a projection type television receiver which comprises a reflecting optical projecting system having a concave image projecting mirror, with said mirror having an optical axis and a substantially spherical object surface, and a cathode ray tube having a substantially spherical image screen of rational symmetry of substantially the same curvature as said object surface and having an axis substantially coincident with the axis of symmetry of said screen; an adjusting device for the tube comprising a housing adapted to support said mirror, a substantially planar member slideably supported in the plane thereof on said housing and adapted to hold said tube with said screen in the neighborhood of said object surface and with the plane of said member normal to said tube axis, said member having a main axis at right angles to the said plane thereof and adapted to coincide with said tube axis, first and second studs on said housing supported thereby to be movable each in a given line in the plane of said plate, passing substantially through said axis thereof, said lines being normal to each other, a third stud on said housing supported thereby to move in a line in said plane of said plate distant from said axis thereof, said member having two arcuate slots substantially concentric with said axis and the sides of which closely engage respectively said first and second studs and being disposed substantially at right angles with respect to said axis, a longitudinal slot having its length disposed along a line passing substantially through said first two studs and said axis and closely engaging said third stud, whereby said plate may be slideably moved to bring the screen of the tube which may be mounted thereon and the object surface of the mirror into substantially coincidence and whereby the screen of the tube which may be mounted on said plate may be rotated about its axis.

JAN KUPERUS.
PIETER MARTINUS van ALPHEN.

REFERENCES CITED

The following references are of record in the file of this patent:

UNITED STATES PATENTS

| Number | Name | Date |
|---|---|---|
| 1,138,848 | Dake | May 11, 1915 |
| 1,273,994 | Bohan | July 30, 1918 |
| 1,400,227 | Minick | Dec. 13, 1921 |
| 1,543,230 | Lear | June 23, 1925 |
| 1,792,832 | Graham | Feb. 17, 1931 |
| 2,273,801 | Landis | Feb. 17, 1942 |

FOREIGN PATENTS

| Number | Country | Date |
|---|---|---|
| 841,458 | France | May 22, 1939 |